(12) United States Patent
Hisada et al.

(10) Patent No.: US 7,832,158 B2
(45) Date of Patent: Nov. 16, 2010

(54) WALL STRUCTURE

(75) Inventors: Takashi Hisada, Tokyo (JP); Norihide Imagawa, Inagi (JP); Hideki Ogura, Higashimurayama (JP)

(73) Assignees: Tis & Partners Co., Ltd., Tokyo (JP); A Factory Inc., Tokyo (JP)

( * ) Notice: Subject to any disclaimer, the term of this patent is extended or adjusted under 35 U.S.C. 154(b) by 0 days.

(21) Appl. No.: 11/791,667

(22) PCT Filed: Nov. 24, 2005

(86) PCT No.: PCT/JP2005/021540

§ 371 (c)(1),
(2), (4) Date: Mar. 19, 2008

(87) PCT Pub. No.: WO2006/057281

PCT Pub. Date: Jun. 1, 2006

(65) Prior Publication Data

US 2009/0019810 A1    Jan. 22, 2009

(30) Foreign Application Priority Data

Nov. 25, 2004  (JP) .............................. 2004-340401

(51) Int. Cl.
*E06B 3/68* (2006.01)

(52) U.S. Cl. .............. 52/204.6; 52/204.591; 52/204.61; 52/456

(58) Field of Classification Search .............. 52/204.6, 52/204.591, 202, 203, 204.61, 204.69, 780, 52/456, 167.1, 167.3, 204.59, 106, 653.1, 52/306–308; 49/15

See application file for complete search history.

(56) References Cited

U.S. PATENT DOCUMENTS

| | | | | |
|---|---|---|---|---|
| 1,580,107 A | * | 4/1926 | Anderson | 52/243.1 |
| 1,963,774 A | * | 6/1934 | Brogden | 52/282.5 |
| 1,970,404 A | * | 8/1934 | Tesch | 52/81.3 |
| 2,169,273 A | * | 8/1939 | Mills | 52/210 |
| 2,322,700 A | * | 6/1943 | Mussey | 52/455 |
| 3,421,259 A | * | 1/1969 | Egan | 49/62 |
| 3,731,450 A | * | 5/1973 | Du | 52/653.1 |
| 3,760,541 A | * | 9/1973 | Fulcher | 52/203 |
| 5,185,979 A | * | 2/1993 | Azzimonti | 52/235 |
| 5,333,428 A | * | 8/1994 | Taylor et al. | 52/308 |

FOREIGN PATENT DOCUMENTS

| | | |
|---|---|---|
| JP | 07-317181 | 12/1995 |
| JP | 10-196023 | 7/1998 |
| JP | 2003-268899 | 9/2003 |

* cited by examiner

*Primary Examiner*—Brian E Glessner
*Assistant Examiner*—James J Buckle, Jr.
(74) *Attorney, Agent, or Firm*—Fulbright & Jaworski LLP

(57) ABSTRACT

An inner area of a framing or framework is divided into a plurality of openings by metal frame bars arranged in a lattice pattern. Particular openings are closed by surface glass panes fitted therein, and the remaining openings by metal plates fitted therein. Spacers 10 softer than the surface glass panes and frame bars and capable of transmitting external forces through the frame bars and surface glass panes are mounted in the openings, between end surfaces extending along sides of the surface glass panes and the frame bars. The spacers not adhering to the surface glass panes are spaced from corners of the surface glass panes.

5 Claims, 5 Drawing Sheets

WALL STRUCTURE

RELATED APPLICATION

This application is a §371 from PCT/JP2005/021540 filed Nov. 24, 2005, which claims priority from Japanese Patent Application No. JP2004-340401 filed Nov. 24, 2004 filed, each of which is herein incorporated by reference in its entirety.

TECHNICAL FIELD

This invention relates to a wall structure having an inner area of a framing or framework divided into a plurality of openings by metal frame bars arranged in a lattice pattern, each opening being closed by a plate fitted therein.

BACKGROUND ART

The above wall structure can prevent in-plane deformation of a wall surface due to horizontal forces such as of winds and earthquakes, without using specifically a framing, framework or frame bars of high strength, by restricting deformation of the openings through contact, occurring with the deformation of the openings, between the frame bars and the plates fitted in the openings.

The in-plane deformation refers to a deformation of a wall surface in which, for example, a crossing angel between shafts in two opposite corners along one diagonal line of the framing or framework widens, and a crossing angle between shafts in two opposite corners along the other diagonal line narrows.

Conventionally, in order to secure transparency of the wall, polygonal surface glass panes may be fitted in particular openings among the plurality of openings.

When an external force acts on the surface glass panes in a direction along the glass plane, stress tends to concentrate on parts of the surface glass panes. Therefore, by taking into consideration that damage can easily be done due to cracks produced in locations of stress concentration, when fitting surface glass panes in the openings as a building structural member, they are fitted in the openings through an elastic cushioning material, for example, to minimize the external force acting on the surface glass panes (this is a commonly used technique, and prior art document information cannot be disclosed).

OBJECTS OF THE PRESENT INVENTION

When fitting polygonal surface glass panes in particular openings in order to secure transparency of the wall, the function of restrict deformation of the openings cannot be expected of the surface glass panes. Thus, there is a disadvantage that yield strength as the entire wall lowers greatly.

The objects of this invention, therefore, are to restrict deformation of the openings when polygonal surface glass panes are fitted in particular openings among a plurality of openings in order to secure transparency of a wall, and to prevent in-plane deformation of a wall surface without using specifically a framing framework or frame bars of high strength.

SUMMARY OF THE INVENTION

A first characteristic construction, for fulfilling the above objects, according to this invention lies in a wall structure having an inner area of a framing or framework divided into a plurality of openings by metal frame bars arranged in a lattice pattern, each of said openings being closed by a plate fitted therein, wherein polygonal surface glass panes are employed as the plates fitted in particular openings among the plurality of openings, and metal plates are employed as the plates fitted in the remaining openings; and spacers softer than said surface glass panes and said frame bars and capable of transmitting external forces through said frame bars and said surface glass panes are mounted in said openings between end surfaces extending along sides of said surface glass panes and said frame bars, as spaced from corners of said surface glass panes, and not adhering to the surface glass panes.

According to this system, polygonal surface glass panes are fitted in particular openings among the plurality of openings, and metal plates are fitted in the remaining openings to restrict deformation of the openings resulting from contact with the frame bars accompanying deformation of the openings. It is thus possible to secure transparency of the wall.

The above spacers are mounted in the openings as spaced from the corners of the surface glass panes, and not adhering to the surface glass panes. Thus, with deformation of the openings, a compressive force can be applied positively to the surface glass panes, while preventing stress concentration, from the frame bars through the spacers.

In this way, deformation of the openings can be restricted based on the compression resisting strength of the surface glass panes.

At this time, if the compressive force acts intensively or a tensile force acts on the surface glass panes on narrow ranges around the corners of the surface glass panes, cracks can easily occur within the wall thickness of the surface glass panes due to a shear force acting in the wall thickness of the surface glass in directions along the glass plane.

Thus, in this system, to present stress acting intensively on the narrow ranges around the corners of the surface glass panes, the spacers are mounted in the openings as spaced from the corners of the surface glass panes. To present a tensile force acting on the surface glass panes, the spacers are mounted in the openings in a state not adhering to the surface glass panes. This reduces the possibility of cracks occurring within the wall thickness of the surface glass panes due to the shear force acting in the wall thickness of the surface glass panes.

Therefore, when the polygonal surface glass panes are fitted in the particular openings among the plurality of openings to secure transparency of the wall, deformation of the openings can be restricted. Further, in-plane deformation of the wall surface can be prevented without specially using a highly strong framing or framework and frame bars.

A second character of this invention lies in that the plurality of openings closed by said metal plates are arranged in obliquely vertical directions.

According to this system, deformation of the openings closed by the metal plates is easy to restrict through the contact, occurring with deformation of the openings, between the metal plates fitted in the openings and the metal bars. The plurality of such openings are arranged in obliquely vertical directions, and the frame bars forming these openings can act as braces on the framing or framework, thereby to prevent deformation of the framing or framework.

A third character of this invention lies in that said spacers are mounted at a distance of at least 25.4 mm (1 inch) from said corners.

According to this system, in order to prevent a compressive force acting intensively on the narrow ranges around of the corners of the surface glass panes, the spacers are mounted at a distance of at least 25.4 mm (1 inch) from the corners of the surface glass panes. It is thus possible, as described hereinafter, to secure a large breaking load of the surface glass panes accompanying deformation of the framing or framework.

DETAILED DESCRIPTION OF THE EMBODIMENTS OF THE INVENTION

Embodiments of this invention will be described hereinafter with reference to the drawings.

Figure 1:
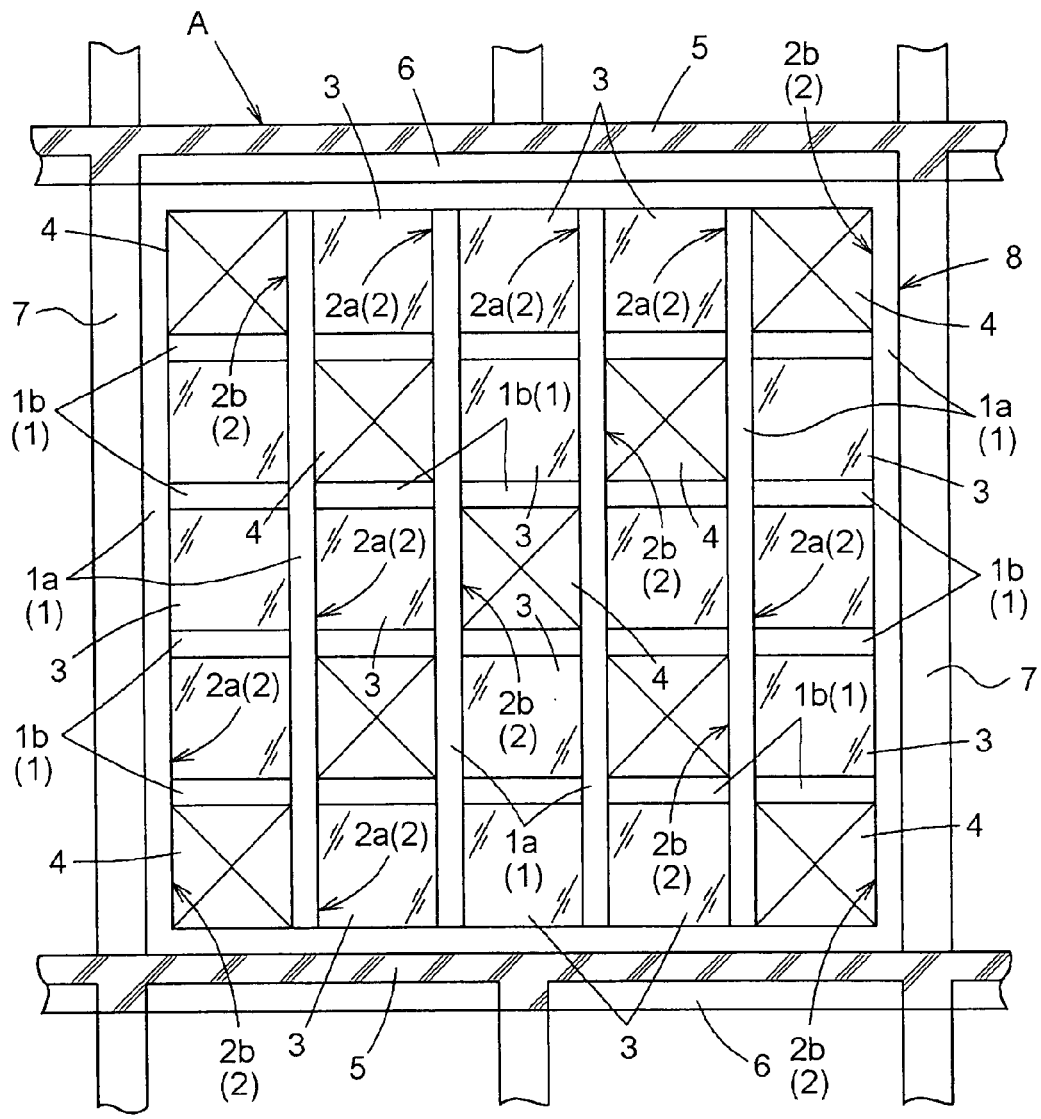
FIG. 1 is a front view of a wall structure in accordance with an embodiment of the present invention.
Figure 2:
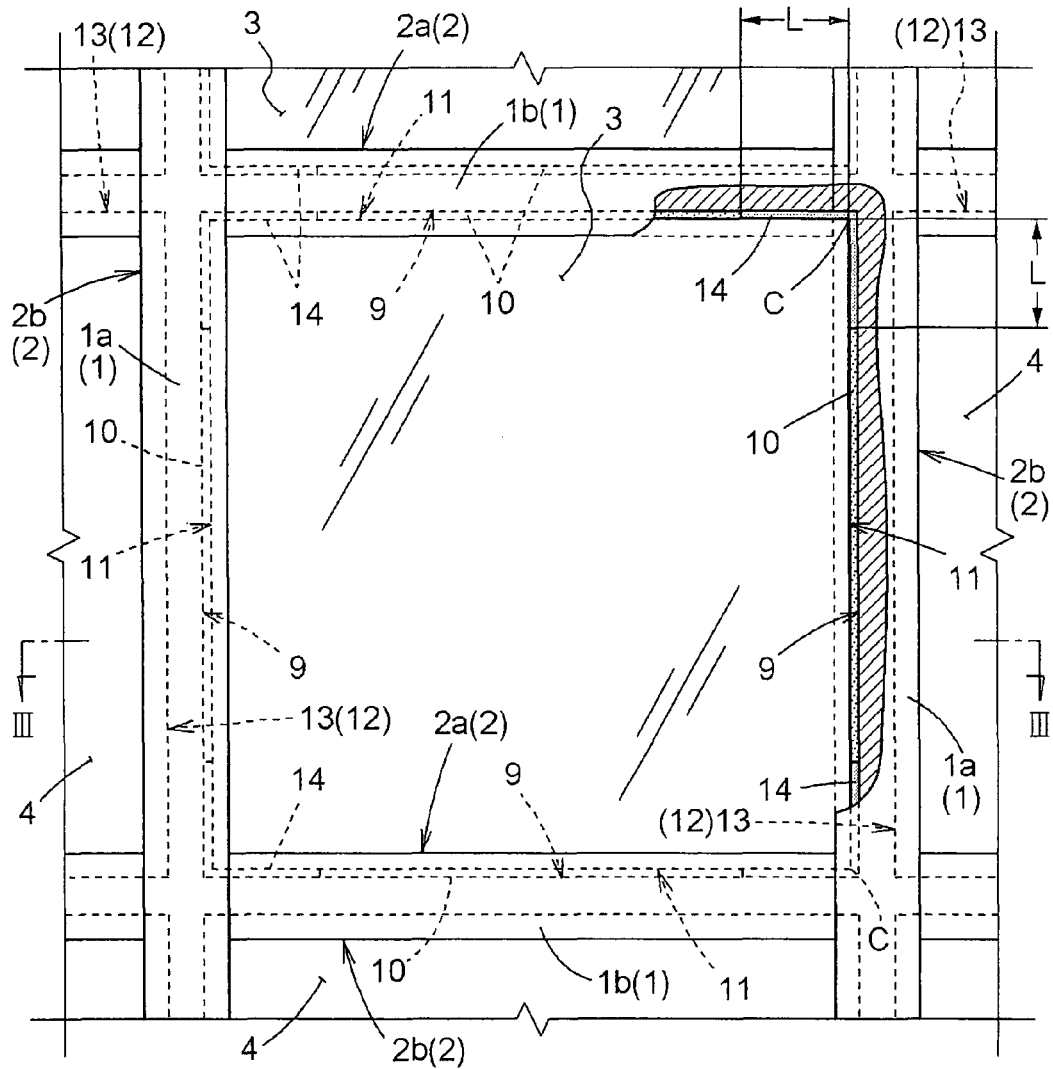
FIG. 2 is a front view, partly in section, of a principal portion of the wall structure of the present invention.
Figure 3:
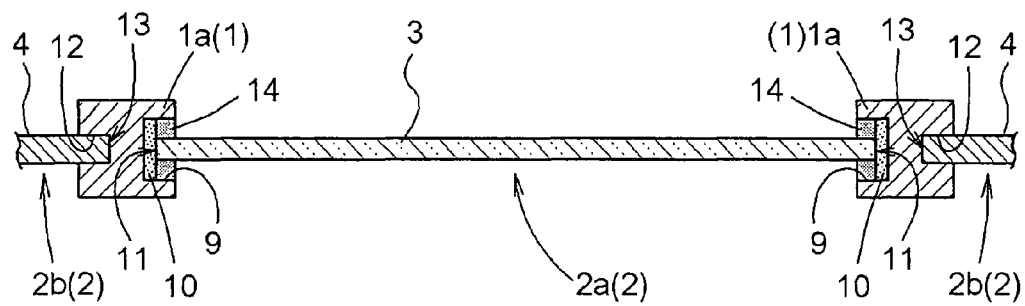
FIG. 3 is a section view on line III-III of FIG. 2.

FIGS. 1-3 show a wall structure in accordance with an embodiment of the present invention.

An inner area of a framing or framework A constructed quadrilateral is divided into a plurality of openings 2 arranged in five rows (odd-numbered rows) vertically and horizontally, by using metal frame bars 1 (1a, 1b) such as of stainless steel arranged in a lattice pattern. The respective openings 2 are closed by plates 3 and 4 fitted therein.

The framing or framework A includes, provided on an outer wall of a building, horizontal members 6 supporting upper and lower floor slabs 5, respectively, and vertical members 7 supporting the horizontal members 6. The horizontal members 6 and vertical members 7 are framed of wood, metal and concrete as components.

The upper and lower horizontal members 6 and right and left vertical members 7 are assembled to form a polygon (a square in this embodiment). Fixed inside the framing or framework A is a metal frame 8 such as of stainless steel formed by assembling vertical frame bars 1a and horizontal frame bars 1b in a lattice pattern.

Polygonal (square in this embodiment) surface glass panes are employed as the plates 3 fitted in particular openings (a plurality of openings in the embodiment) 2a among the plurality of openings 2 partitioned by the frame bars 1a and 1b. On the other hand, polygonal (square in this embodiment) metal plates such as of stainless steel are employed as the plates 4 fitted in the remaining openings 2b.

The surface glass panes 3 and metal plates 4 have respective peripheral edges fixed along the vertical frame bars 1a and horizontal frame bars 1b. The plurality of openings 2b closed by the metal plates 4 are arranged right and left in obliquely vertical direction along the diagonal lines in the framing or framework A.

FIGS. 2 and 3 show a fixing structure of each surface glass pane 3 and each metal plate 4.

Grooves 9 for receiving the edges of the surface glass pane 3 are formed in inner peripheries, opposed to the opening 2a, of the vertical frame bars 1a and horizontal frame bars 1b.

Spacers 10 softer than the surface glass pane 3 and frame bars 1 (1a, 1b) and capable of transmitting external forces through the frame bars (1a, 1b) and surface glass pane 3 are mounted between end surfaces 11 extending along the sides of the surface glass pane 3 and the frame bars 1 (1a, 1b). At this time, the spacers 10 are mounted in the opening 2a to be spaced from corners C of the surface glass pane 3 and not adhering to the surface glass pane 3.

In this way, the surface glass panes 3 are fitted in the openings 2a.

On the other hand, the metal plates 4 are fitted in the openings 2b. That is, grooves 12 are formed in inner peripheries, opposed to the openings 2b, of the vertical frame bars 1a and horizontal frame bars 1b. Edges of each metal plate 4 are fitted in the grooves 12 throughout the entire circumference, to have end surfaces 13 of the plate 4 in contact with the bottoms of the grooves 12.

Elastic cushioning members 14 are mounted between the end surfaces 11 around the corners C of each surface glass pane 3 and the frame bars 1 (1a, 1b), and between glass surfaces of the surface glass pane 3 and the frame bars 1 (1a, 1b), for preventing transfer of external forces from the frame bars 1 (1a, 1b).

Specifically, the spacers 10 are formed of a hard material with Young's modulus (E) at 1000-70000N/mm$^2$, such as polyacetal resin, acrylic resin, nylon 66 or aluminum alloy. On the other hand, the elastic cushioning members 14 are formed of a soft material with Young's modulus (E) at less than 1000N/mm$^2$.

Figure 4:
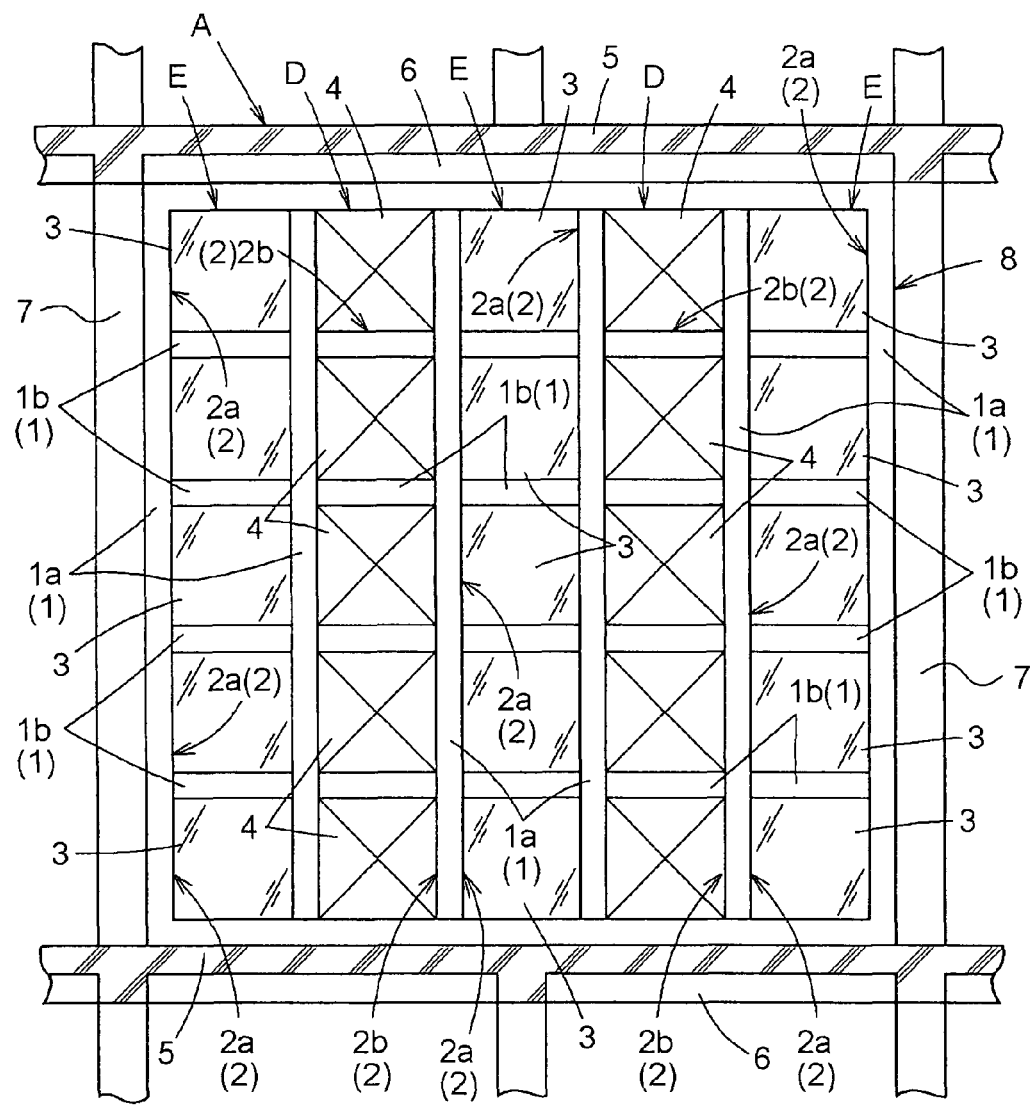
FIG. 4 is a front view showing a wall structure in accordance with a second embodiment of the present invention.

FIG. 4 shows another embodiment of the wall structure according to this invention.

Rows of openings D having vertical arrays of openings 2b closed by the metal plates 4, and rows of openings E having vertical arrays of openings 2a closed by the surface glass panes 3, are arranged alternately along the direction of width of the framing or framework A. At this time, the rows of openings D closed by the metal plates 4 are located in intermediate positions in the direction of width.

The other aspects of construction are the same as in the first embodiment.

Figure 5:
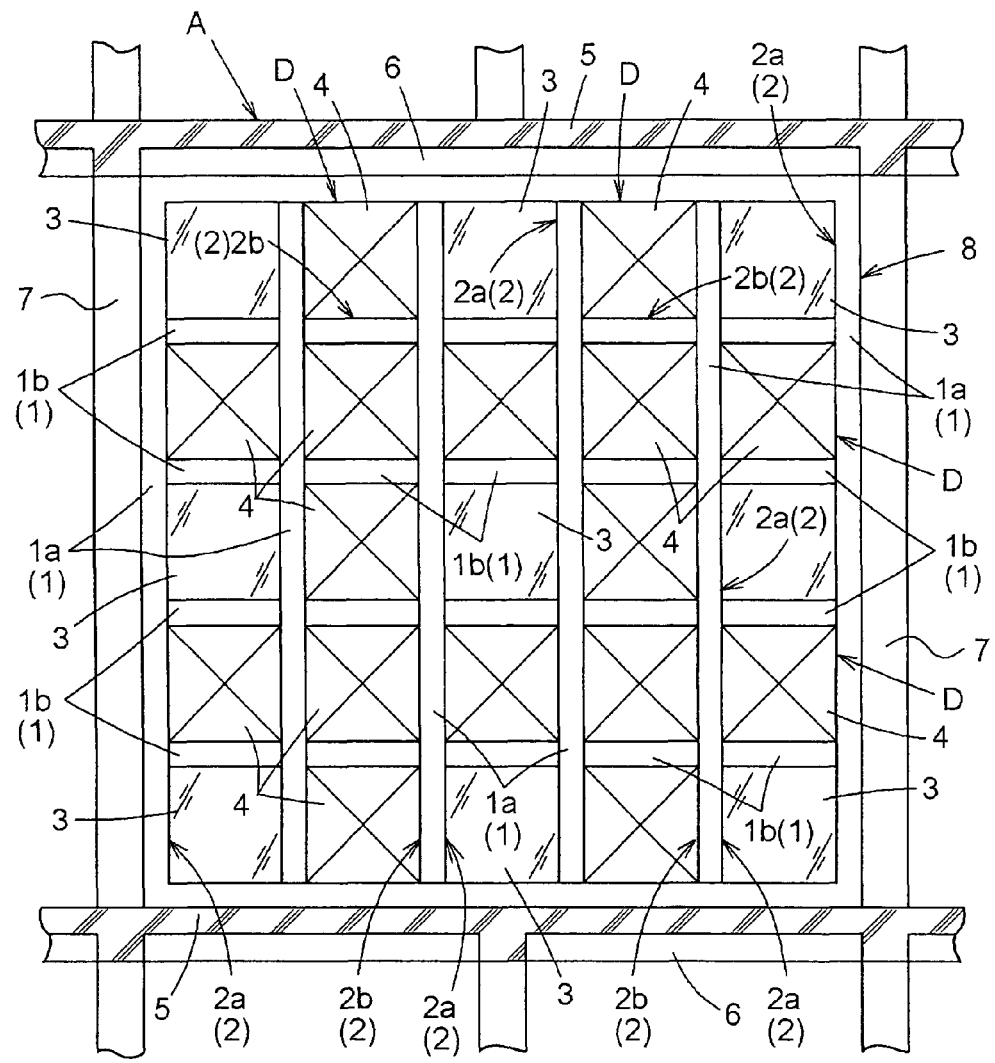
FIG. 5 is a front view showing a wall structure in accordance with a third embodiment of the present invention.

FIG. 5 shows another embodiment of the wall structure according to this invention.

Rows of openings D having arrays of openings 2b closed by the metal plates 4 are arranged in a form of parallel crosses.

The other aspects of construction are the same as in the first embodiment.

1. The wall structure according to this invention may have a single or a plurality of particular opening(s) in which a surface glass pane or panes is/are fitted, among the plurality of openings.

2. In the wall structure according to this invention, an inner area of a framing or framework constructed polygonal and having three or more corners may be divided into a plurality of openings by metal frame bars arranged in a lattice pattern. Surface glass panes may be fitted in particular openings among the plurality of openings, and metal plates in the remaining openings.

3. In the wall structure according to this invention, the particular openings may have, fitted therein, polygonal surface glass panes having three or more corners.

4. In the wall structure according to this invention, the particular openings may have, fitted therein, polygonal surface glass panes of any desired shape different from the shape of the openings.

5. In the wall structure according to this invention, an inner area of a framing or framework provided inside a building may be divided into a plurality of openings by metal frame bars arranged in a lattice pattern. Surface glass panes may be fitted in particular openings among the plurality of openings, and metal plates such as steel plates in the remaining openings.

6. The wall structure according to this invention may include a plurality of spacers arranges intermittently between the end surface along the sides of the surface glass panes and the metal frame bars.

7. The wall structure according to this invention may have a plurality of surface glass panes fitted in each opening to overlap in the direction of thickness.

8. The wall structure according to this invention may use a metal framing or framework itself also one of the metal frame bars.

9. The wall structure according to this invention may have spacers arranged in varied distances from the corners of the sides of the surface glass panes.

10. In the wall structure according to this invention, an inner area of a wooden framing or framework may be divided into a plurality of openings by metal frame bars arranged in a lattice pattern. Surface glass panes may be fitted in particular openings among the plurality of openings, and metal plates such as steel plates in the remaining openings.

11. In the wall structure according to this invention, openings may have fitted therein, any surface glass panes such as of template glass, float glass, tempered glass, laminated glass or double-glazed glass. The type and composition thereof are not limitative. The said surface glass may be mirror.

Example 1

Figure 6:
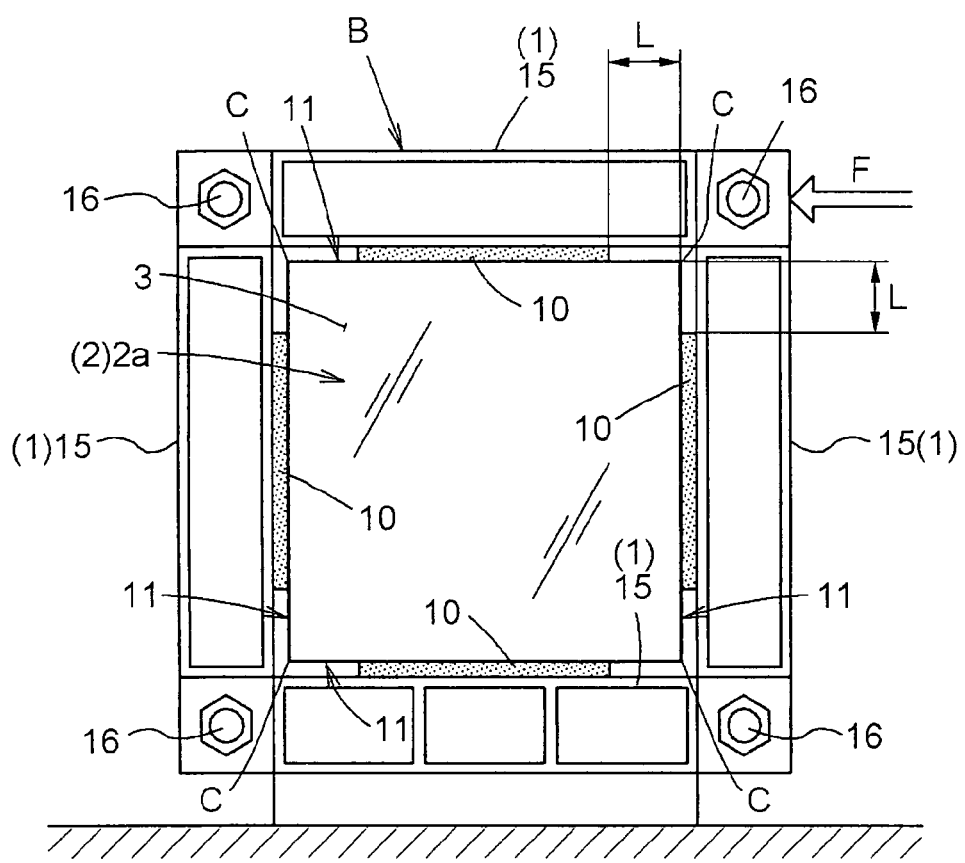
FIG. 6 is a front view of a testing device.

As shown in FIG. 6, a testing device was used to apply a horizontal load F to test model B of an opening 2 in the wall structure according to this invention, and measure a breaking load of the surface glass pane 3 accompanying deformation of the opening 2 (2a) in time of changing distance L of spacers 10 from the corners C.

In the test model B, the opening 2 (2a) is formed by connecting, as metal frame bars 1, four steel members 15 in shape of a frame with pins 16 to be displaceable relative to one another. The surface glass pane (length of one side 500 mm< and thickness: 19 mm) 3 is fitted in the opening 2a, with polyacetal resin spacers (thickness: 5 mm) 10 placed between the end surfaces 11 of the surface glass 3 and inner peripheries of the steel members 15.

There are voids between the end surfaces 11 around the corners C of the surface glass pane 3 and the steel members 15, and elastic cushioning members 14 are not mounted therein.

Sample 1 with the spacers 10 at a distance L of 15 mm from the corners, sample 2 of 25.4 mm (1 inch), sample 3 of 40 mm and sample 4 of 50 mm were prepared. For comparison, a comparative sample with the spacers 10 at a distance L of 0 mm from the corners was prepared.

Horizontal load F was applied to an upper part of the framing or framework A for each sample. Horizontal load F when cracks were formed in the surface glass pane 3 was measured as a breaking load.

Table 1 shows the test results. It is seen that samples 2, 3 and 4 with the distance L of 25.4 mm (1 inch) or more allow the breaking load of surface glass pane 3 accompanying deformation of the framing or framework A to be secured in the magnitude of 80 kN or more which can be used for a quake resisting wall for 4 t (39.2 kN).

TABLE 1

|  | L (mm) | Breaking load (kN) |
| --- | --- | --- |
| comparative sample | 0 | less than 9.8 |
| sample 1 | 15 | 50.0 |
| sample 2 | 25.4 | 80.0 |
| sample 3 | 40 | 112.7 |
| sample 4 | 50 | 135. |

The wall structure according to this invention is applicable to a wall structure having an inner area of a framing or framework divided into a plurality of openings by metal frame bars arranged in a lattice pattern, and polygonal surface glass panes fitted in particular openings among the plurality of openings to secure transparency of the wall.

The invention claimed is:

1. A wall structure having an inner area of a framing or framework divided into a plurality of openings by metal frame bars arranged in a lattice pattern, further comprising:

polygonal surface glass panes fitted in a subset of said plurality of openings to close said subset of said plurality of openings;

metal plates fitted in remaining openings to close said remaining openings;

spacers, softer than said surface glass panes and said frame bars, formed of a hard material with Young's modulus (E) at 1,000-70,000 N/mm$^2$, for transmitting external forces through said frame bars and said polygonal surface glass panes are mounted in said subset of said plurality of openings between end surfaces extending along four sides of said polygonal surface glass panes and said frame bars, said spacers not adhering to said polygonal surface glass panes are spaced from corners of said surface glass panes; and elastic cushioning members, softer than said spacer, formed of a soft material with Young's modulus (E) at less than 1,000 N/mm$^2$, for preventing transfer of external forces from the frame bars are mounted between the end surfaces around the corners of each surface glass pane and the frame bars, and between glass surfaces of the surface glass pane and the frame bars.

2. The wall structure of claim 1, wherein said remaining openings closed by said metal plates are arranged diagonally.

3. The wall structure of claim 1, wherein said spacers are mounted at a distance of at least 25.4 mm (1 inch) from said corners.

4. The wall structure of claim 1, wherein said spacers are arranged at varied distances from the corners on the sides of the surface glass panes.

5. The wall structure of claim 2, wherein said spacers are arranged at varied distances from the corners on the sides of the surface glass panes.

* * * * *